(No Model.) 2 Sheets—Sheet 1.
N. G. BARTLETT & E. E. EDGERTON.
FILM HOLDER.
No. 532,751. Patented Jan. 22, 1895.
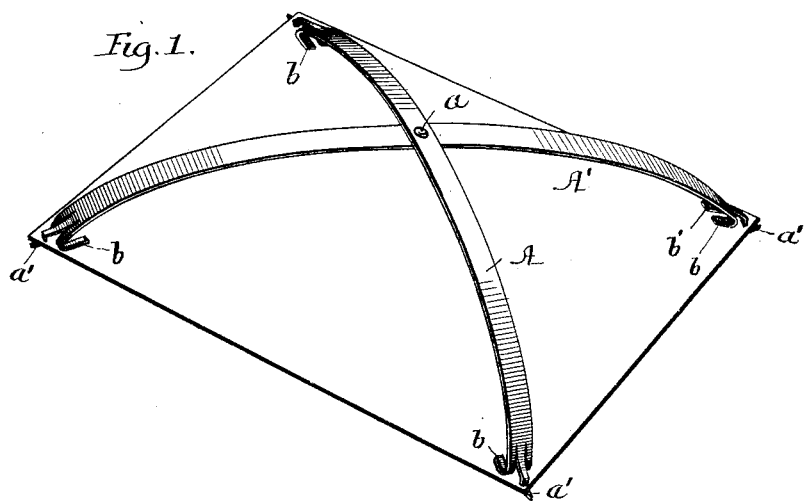
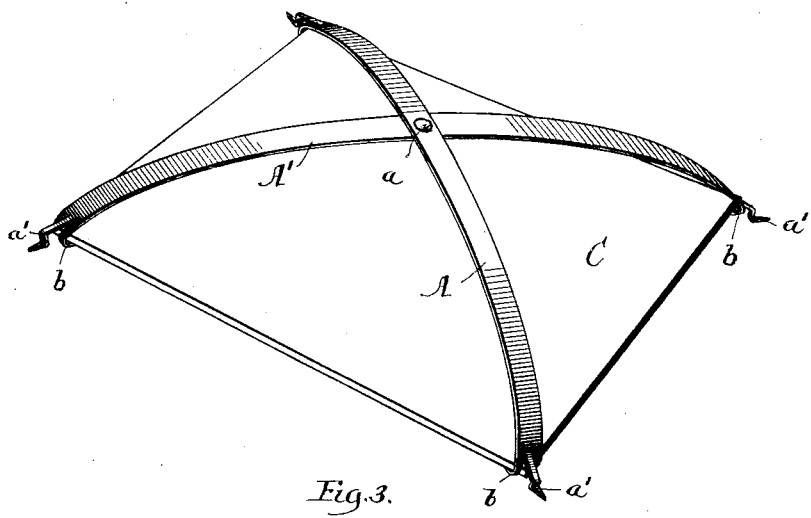
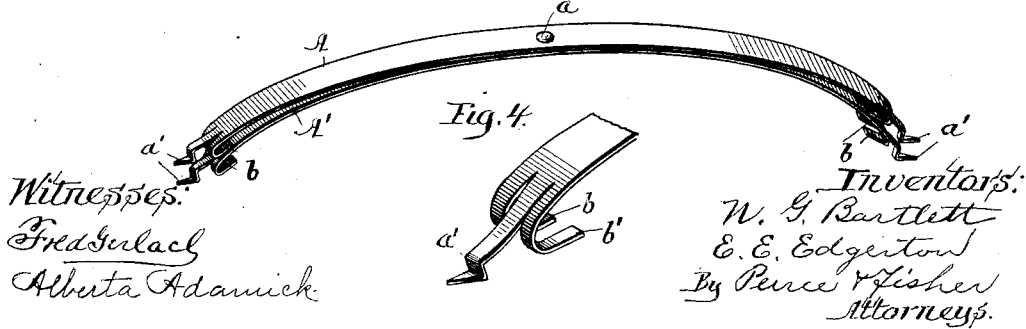
Witnesses:
Fred Gerlach
Alberta Adamick
Inventors:
N. G. Bartlett
E. E. Edgerton
By Pierce & Fisher
Attorneys.

(No Model.) 2 Sheets—Sheet 2.
N. G. BARTLETT & E. E. EDGERTON.
FILM HOLDER.
No. 532,751. Patented Jan. 22, 1895.
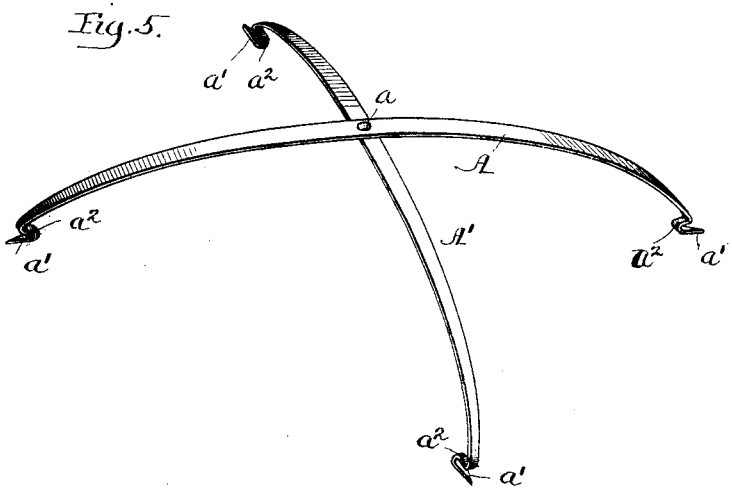
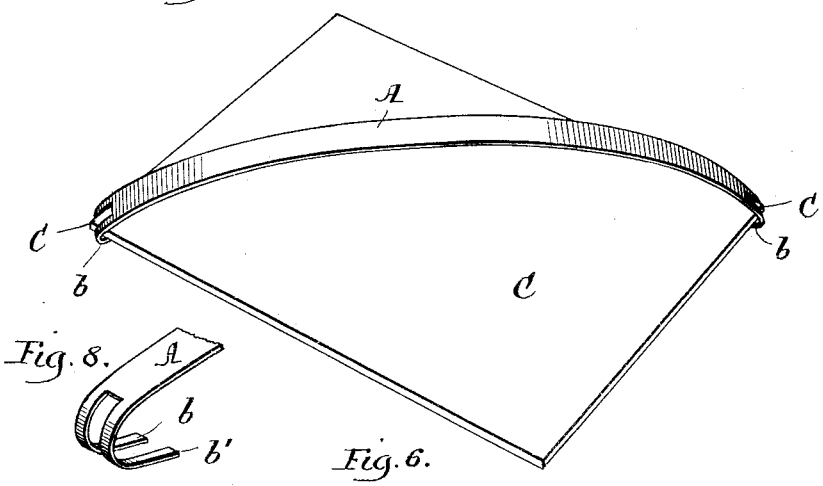
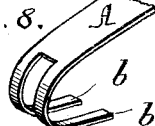
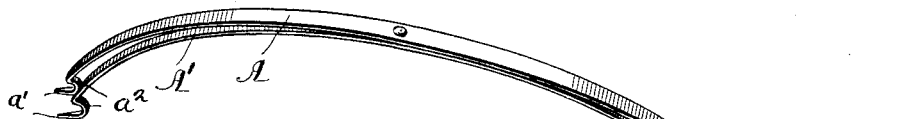
Witnesses:
Fred Gerlach
Alberta Adamick
Inventors:
N. G. Bartlett
E. E. Edgerton
By Peirce & Fisher
Attorneys.

UNITED STATES PATENT OFFICE.

NICHOLAS GRAY BARTLETT AND EDWARD E. EDGERTON, OF CHICAGO, ILLINOIS.

FILM-HOLDER.

SPECIFICATION forming part of Letters Patent No. 532,751, dated January 22, 1895.

Application filed February 5, 1894. Serial No. 499,054. (No model.)

*To all whom it may concern:*

Be it known that we, NICHOLAS GRAY BARTLETT and EDWARD E. EDGERTON, citizens of the United States, residing at Chicago, county of Cook, and State of Illinois, have invented certain new and useful Improvements in Film-Extenders and Plate-Clips, of which we do declare the following to be a full, clear, and exact description, reference being had to the accompanying drawings, forming part of this specification.

Our present invention has for its objects, first, to provide a simple, cheap and effective means whereby photo-negative films can be held in extended condition during the developing operation and while being dried, and second, to provide a simple and effective means whereby a glass negative plate can be conveniently manipulated while being developed. In attaining these objects of invention, one instrument can be so constructed as to serve both as a film extender and a glass plate clip or the features of invention hereinafter described can be separately employed;—that is to say, one part of the invention may be embodied in an instrument suitable as a film extender only, while the other part may be embodied in an instrument adapted only for the convenient manipulation of glass negative plates. Therefore, we do not wish our invention to be understood as restricted to an instrument so constructed as to serve both purposes, since while the features are susceptible of conjoint embodiment as hereinafter described, they can manifestly be separately embodied.

Figure 1 is a perspective view of a combined film extender and plate clip embodying our invention, a film being shown as held thereby in extended condition. Fig. 2 is a perspective view similar to Fig. 1 but showing the instrument as used for holding a glass negative plate. Fig. 3 is a perspective view showing the bars of the instrument in collapsed condition for convenient packing. Fig. 4 is an enlarged perspective view in detail of one end of one of the bars. Fig. 5 is a perspective view of a modified form of the invention. Fig. 6 is a view in side elevation showing the cross bars illustrated in Fig. 5 in collapsed condition. Fig. 7 is a view of a glass plate negative clip embodying features of our invention. Fig. 8 is a detail perspective view of one end of the bar shown in Fig. 7.

A and A' designate two cross bars that are pivoted together as at $a$, these bars A and A' being preferably formed of narrow strips of thin sheet brass or other suitable elastic material, the bars A and A' being curved downwardly as shown. The ends of both the bars A and A' in the form of the invention illustrated upon sheet 1 of the drawings, are formed with the points or hooks $a'$ that are bent in such manner as to enable them to engage the film as illustrated in Fig. 1 of the drawings, and preferably the points or hooks $a'$ have the proper shape given thereto by bending the same downwardly and outwardly as shown. (See Fig. 4.) It will thus be seen that when a film is to be extended it is only necessary to pass the points of the bars A and A' through the film as shown in Fig. 1, preferably at its corners the curvature of the bars being somewhat increased at the time the points are inserted through the film, so that the elasticity of the bars shall hold the film in engagement with the points and in extended condition. By forming the bars A and A' of elastic material, as we prefer to do the film can be securely held in extended condition and by connecting the bars so that they can be collapsed or brought into substantial alignment as shown in Fig. 3, they can be readily packed so as to occupy but very little space.

In the form of our invention illustrated upon Sheet 1 of the drawings, the ends of the bars A and A' are formed also with the inturned hooks $b$ and $b'$, these hooks serving to engage the edges of a glass plate C when the instrument is to be used to manipulate such plates during the developing operation.

In practice we prefer to form the hooks $b$ and $b'$ of sufficient distance apart to permit the hooks to engage the diagonal opposite corners of the glass plate as illustrated in Fig. 2 of the drawings, although it is manifest that the precise construction of hook shown is not essential to the broad feature of the invention. When the glass plate C is thus engaged by the hooks $b$ and $b'$ the curvature of the bars A and A' will be somewhat flattened so that the elasticity of the bars will serve to retain the hooks in engagement with the corners of the plate, thereby permitting the plates to be readily manipulated in the developing bath or be lifted therefrom in order to enable the process of development to be watched.

From the foregoing description it will be seen that the instrument illustrated upon Sheet 1 of the drawings, is adapted for use either as a film extender or as a means for permitting glass plates to be readily manipulated, but it is manifest that these features of the invention can be embodied in separate instruments and can be modified to considerable extent without departing from the spirit of the invention. Thus in Figs. 5 and 6 of the drawings we have illustrated a modified form of our invention in which the bars A and A' pivotally connected together as at $a$, have their ends provided with points or hooks $a'$ adapted to engage a film as illustrated in Fig. 1 of the drawings, the elasticity of the bars serving to retain the points or hooks in secure engagement with the film.

If desired, the points or hooks $a'$ may be bent inwardly abruptly as at $a^2$ so as to form shoulders or hooks to engage the edges of a glass plate. When this last described form of instrument is to be used as a film extender the hooks will be inserted through the film as illustrated in Fig. 1, or if it is to be used as a clip for glass plates, the edges of the plate will be engaged by the hook portions $a^2$ at the ends of the bars A and A'.

A very simple embodiment of one feature of our invention is illustrated in Figs. 7 and 8 of the drawings in which a bar A of elastic material, such as sheet brass or the like, has its ends formed with the hooks $b$ and $b'$ adapted to engage the diagonal opposite corners of a glass plate C and this form of the invention affords a convenient means for manipulating glass plates particularly of small size.

It is manifest that the precise details of construction above set out may be varied within wide limits without departing from the spirit of our invention.

By forming the bars so that they can be adjusted with respect to each other the instrument is readily adapted for different sizes of films or plates.

Having thus described the invention, what we claim as new, and desire to secure by Letters Patent, is—

1. An article of the character described formed of cross-bars A A', having their ends inclined downwardly and bent to form outwardly extending points to engage and retain the film, substantially as described.

2. An article of the character described formed of cross-bars A and A' of elastic and flexible material pivotally connected together by an axis vertical to their horizontal plane and provided at their ends with points to engage a film and retain it in extended position under the elastic action of said bars, substantially as described.

3. An article of the character described formed of cross-bars A and A' of elastic and flexible material connected together and having each of their ends provided with outwardly extending points to engage a film and retain it in distended position under the elastic action of said bars, substantially as described.

4. An article of the character described formed of downwardly bent bars A and A' of elastic and flexible plate material, crossing each other substantially as shown and pivoted together and provided at their ends with outwardly extending points to engage and retain a film, substantially as described.

5. An article of the character described formed of the cross bars A and A' of elastic and flexible material, each of said cross-bars having its ends provided with downwardly and outwardly extending points to engage a film and to retain it in distended position under the elastic action of said bars, substantially as described.

6. An article of the character described, comprising a downwardly curved bar of elastic plate having at each of its ends and integral therewith the separate inwardly turned hooks to engage the diagonal corners of a plate, substantially as described.

7. An article of the character described, comprising two cross bars provided at their ends with hooks or shoulders to engage the plate and with points to engage a film, substantially as described.

N. GRAY BARTLETT.
EDWARD E. EDGERTON.

Witnesses:
GEO. P. FISHER, Jr.,
FRED GERLACH.